US010140664B2

(12) United States Patent
Erenrich

(10) Patent No.: US 10,140,664 B2
(45) Date of Patent: Nov. 27, 2018

(54) RESOLVING SIMILAR ENTITIES FROM A TRANSACTION DATABASE

(71) Applicant: Palantir Technologies, Inc., Palo Alto, CA (US)

(72) Inventor: Daniel Erenrich, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 561 days.

(21) Appl. No.: 13/827,491

(22) Filed: Mar. 14, 2013

(65) Prior Publication Data

US 2014/0279299 A1 Sep. 18, 2014

(51) Int. Cl.
| G07B 17/00 | (2006.01) |
| G07F 19/00 | (2006.01) |
| G06Q 40/00 | (2012.01) |
| G06F 17/30 | (2006.01) |
| G06Q 30/02 | (2012.01) |
| G06Q 40/02 | (2012.01) |

(52) U.S. Cl.
CPC ....... *G06Q 40/10* (2013.01); *G06F 17/30312* (2013.01); *G06F 17/30705* (2013.01); *G06Q 30/02* (2013.01); *G06Q 40/02* (2013.01)

(58) Field of Classification Search
CPC ........ G06Q 40/10; G06Q 40/02; G06Q 40/00; G06F 17/00
USPC ...................................................... 705/30, 35
See application file for complete search history.

(56) References Cited

U.S. PATENT DOCUMENTS

| 5,241,625 A | 8/1993 | Epard et al. |
| 5,819,226 A | 10/1998 | Gopinathan et al. |
| 5,826,021 A | 10/1998 | Mastors et al. |
| 5,832,218 A | 11/1998 | Gibbs et al. |
| 5,845,300 A | 12/1998 | Comer |
| 5,878,434 A | 3/1999 | Draper et al. |
| 5,892,900 A | 4/1999 | Ginter et al. |

(Continued)

FOREIGN PATENT DOCUMENTS

| AU | 2014203669 | 5/2016 |
| CN | 102546446 | 7/2012 |

(Continued)

OTHER PUBLICATIONS

Anonymous, "A Real-World Problem of Matching Records," Nov. 2006, <http://grupoweb.upf.es/bd-web/slides/ullman.pdf> (16 pages).

(Continued)

*Primary Examiner* — Oluseye Iwarere
(74) *Attorney, Agent, or Firm* — Sheppard Mullin Richter & Hampton LLP

(57) ABSTRACT

A technique for identifying related transaction records from a database storing transaction records for multiple entities includes grouping transaction records with a common attribute value into transaction record sets, receiving a selection of an exemplar record set and determining the probability the transaction record set stores transaction records associated with a first entity. Other operations include resolving the transaction record set as storing transaction records associated with the first entity. This improves the process of identifying related transaction records because related transaction records missed by string comparisons transaction record attributes are detected.

20 Claims, 5 Drawing Sheets

(56) References Cited

U.S. PATENT DOCUMENTS

| | | | |
|---|---|---|---|
| 5,897,636 A | 4/1999 | Kaeser | |
| 5,966,706 A | 10/1999 | Biliris et al. | |
| 6,006,242 A | 12/1999 | Poole et al. | |
| 6,057,757 A | 5/2000 | Arrowsmith et al. | |
| 6,065,026 A | 5/2000 | Cornelia et al. | |
| 6,094,643 A | 7/2000 | Anderson et al. | |
| 6,101,479 A | 8/2000 | Shaw | |
| 6,134,582 A | 10/2000 | Kennedy | |
| 6,232,971 B1 | 5/2001 | Haynes | |
| 6,237,138 B1 | 5/2001 | Hameluck et al. | |
| 6,243,706 B1 | 6/2001 | Moreau et al. | |
| 6,243,717 B1 | 6/2001 | Gordon et al. | |
| 6,430,305 B1* | 8/2002 | Decker | 382/116 |
| 6,463,404 B1 | 10/2002 | Appleby | |
| 6,519,627 B1 | 2/2003 | Dan et al. | |
| 6,523,019 B1 | 2/2003 | Borthwick | |
| 6,820,135 B1 | 11/2004 | Dingman | |
| 6,944,821 B1 | 9/2005 | Bates et al. | |
| 6,978,419 B1 | 12/2005 | Kantrowitz | |
| 6,980,984 B1 | 12/2005 | Huffman et al. | |
| 7,058,648 B1 | 6/2006 | Lightfoot et al. | |
| 7,089,541 B2 | 8/2006 | Ungar | |
| 7,168,039 B2 | 1/2007 | Bertram | |
| 7,174,377 B2 | 2/2007 | Bernard et al. | |
| 7,392,254 B1 | 6/2008 | Jenkins | |
| 7,403,942 B1 | 7/2008 | Bayliss | |
| 7,461,158 B2 | 12/2008 | Rider et al. | |
| 7,617,232 B2 | 11/2009 | Gabbert et al. | |
| 7,627,489 B2 | 12/2009 | Schaeffer et al. | |
| 7,739,246 B2 | 6/2010 | Mooney et al. | |
| 7,756,843 B1 | 7/2010 | Palmer | |
| 7,757,220 B2 | 7/2010 | Griffith et al. | |
| 7,765,489 B1 | 7/2010 | Shah et al. | |
| 7,800,796 B2 | 9/2010 | Saito | |
| 7,877,421 B2 | 1/2011 | Berger et al. | |
| 7,880,921 B2 | 2/2011 | Dattilo et al. | |
| 7,899,796 B1 | 3/2011 | Borthwick et al. | |
| 7,912,842 B1 | 3/2011 | Bayliss | |
| 7,917,376 B2 | 3/2011 | Bellin et al. | |
| 7,941,321 B2 | 5/2011 | Greenstein et al. | |
| 7,941,336 B1 | 5/2011 | Robin-Jan | |
| 7,966,199 B1 | 5/2011 | Frasher | |
| 7,958,147 B1 | 6/2011 | Turner et al. | |
| 7,962,495 B2 | 6/2011 | Jain et al. | |
| 8,036,971 B2 | 10/2011 | Aymeloglu et al. | |
| 8,046,283 B2 | 10/2011 | Burns | |
| 8,054,756 B2 | 11/2011 | Chand et al. | |
| 8,073,857 B2 | 12/2011 | Sreekanth | |
| 8,117,022 B2 | 2/2012 | Linker | |
| 8,126,848 B2 | 2/2012 | Wagner | |
| 8,147,715 B2 | 4/2012 | Bruckhaus et al. | |
| 8,214,490 B1 | 7/2012 | Vos et al. | |
| 8,219,550 B2* | 7/2012 | Merz | G06F 17/30985 707/727 |
| 8,229,902 B2 | 7/2012 | Vishniac et al. | |
| 8,232,725 B1 | 7/2012 | Wedding | |
| 8,290,838 B1* | 10/2012 | Thakur et al. | 705/35 |
| 8,302,855 B2* | 11/2012 | Ma et al. | 235/379 |
| 8,364,642 B1 | 1/2013 | Garrod | |
| 8,386,377 B1 | 2/2013 | Xiong et al. | |
| 8,392,556 B2 | 3/2013 | Goulet et al. | |
| 8,417,715 B1 | 4/2013 | Bruckhaus et al. | |
| 8,429,527 B1 | 4/2013 | Arbogast | |
| 8,473,454 B2 | 6/2013 | Evanitsky et al. | |
| 8,484,115 B2 | 7/2013 | Aymeloglu et al. | |
| 8,554,719 B2 | 10/2013 | McGrew | |
| 8,589,273 B2 | 11/2013 | Creeden et al. | |
| 8,600,872 B1 | 12/2013 | Yan | |
| 8,601,326 B1 | 12/2013 | Kirn | |
| 8,639,552 B1 | 1/2014 | Chen et al. | |
| 8,666,861 B2 | 3/2014 | Li et al. | |
| 8,688,573 B1* | 4/2014 | Rukonic et al. | 705/39 |
| 8,732,574 B2 | 5/2014 | Burr et al. | |
| 8,738,486 B2* | 5/2014 | McGeehan | G06Q 30/02 705/35 |
| 8,744,890 B1 | 6/2014 | Bernier | |
| 8,798,354 B1* | 8/2014 | Bunzel | G06Q 20/0425 382/137 |
| 8,799,313 B2 | 8/2014 | Satlow | |
| 8,812,444 B2 | 8/2014 | Garrod et al. | |
| 8,812,960 B1 | 8/2014 | Sun et al. | |
| 8,838,538 B1 | 9/2014 | Landau et al. | |
| 8,855,999 B1 | 10/2014 | Elliot | |
| 8,903,717 B2 | 12/2014 | Elliot | |
| 8,924,388 B2 | 12/2014 | Elliot et al. | |
| 8,924,389 B2 | 12/2014 | Elliot et al. | |
| 8,938,434 B2 | 1/2015 | Jain et al. | |
| 8,938,686 B1 | 1/2015 | Erenrich et al. | |
| 8,949,164 B1 | 2/2015 | Mohler | |
| 8,984,390 B2 | 3/2015 | Aymeloglu et al. | |
| 9,032,531 B1 | 5/2015 | Scorvo et al. | |
| 9,058,315 B2 | 6/2015 | Burr et al. | |
| 9,100,428 B1 | 8/2015 | Visbal | |
| 9,105,000 B1 | 8/2015 | White et al. | |
| 9,129,219 B1 | 9/2015 | Robertson et al. | |
| 9,230,060 B2 | 1/2016 | Friedlander et al. | |
| 9,286,373 B2 | 3/2016 | Elliot et al. | |
| 9,348,499 B2 | 5/2016 | Aymeloglu et al. | |
| 9,348,851 B2 | 5/2016 | Kirn | |
| 2001/0027424 A1 | 10/2001 | Torigoe | |
| 2002/0032677 A1 | 3/2002 | Morgenthaler et al. | |
| 2002/0035590 A1 | 3/2002 | Eibach et al. | |
| 2002/0065708 A1 | 5/2002 | Senay et al. | |
| 2002/0095360 A1* | 7/2002 | Joao | 705/30 |
| 2002/0095658 A1 | 7/2002 | Shulman | |
| 2002/0103705 A1* | 8/2002 | Brady | 705/14 |
| 2002/0147805 A1 | 10/2002 | Leshem et al. | |
| 2002/0194058 A1 | 12/2002 | Eldering | |
| 2003/0036927 A1 | 2/2003 | Bowen | |
| 2003/0061132 A1 | 3/2003 | Mason et al. | |
| 2003/0074187 A1 | 4/2003 | Ait-Mokhtar et al. | |
| 2003/0088438 A1 | 5/2003 | Maughan et al. | |
| 2003/0093401 A1 | 5/2003 | Czahkowski et al. | |
| 2003/0105759 A1 | 6/2003 | Bess et al. | |
| 2003/0115481 A1 | 6/2003 | Baird et al. | |
| 2003/0126102 A1 | 7/2003 | Borthwick | |
| 2003/0171942 A1 | 9/2003 | Gaito | |
| 2003/0177112 A1 | 9/2003 | Gardner | |
| 2003/0182313 A1 | 9/2003 | Federwisch et al. | |
| 2003/0212718 A1 | 11/2003 | Tester | |
| 2004/0003009 A1 | 1/2004 | Wilmot | |
| 2004/0006523 A1 | 1/2004 | Coker | |
| 2004/0034570 A1* | 2/2004 | Davis | 705/26 |
| 2004/0044648 A1 | 3/2004 | Anfindsen et al. | |
| 2004/0083466 A1 | 4/2004 | Dapp et al. | |
| 2004/0088177 A1 | 5/2004 | Travis et al. | |
| 2004/0111480 A1 | 6/2004 | Yue | |
| 2004/0117387 A1 | 6/2004 | Civetta et al. | |
| 2004/0153418 A1 | 8/2004 | Hanweck | |
| 2004/0153451 A1 | 8/2004 | Phillips et al. | |
| 2004/0205492 A1 | 10/2004 | Newsome | |
| 2004/0210763 A1 | 10/2004 | Jonas | |
| 2004/0236688 A1* | 11/2004 | Bozeman | 705/42 |
| 2005/0010472 A1* | 1/2005 | Quatse et al. | 705/14 |
| 2005/0028094 A1 | 2/2005 | Allyn | |
| 2005/0039116 A1 | 2/2005 | Slack-Smith | |
| 2005/0086207 A1 | 4/2005 | Heuer et al. | |
| 2005/0091186 A1 | 4/2005 | Alon | |
| 2005/0097441 A1 | 5/2005 | Herbach et al. | |
| 2005/0102328 A1 | 5/2005 | Ring et al. | |
| 2005/0125715 A1 | 6/2005 | Di Franco et al. | |
| 2005/0131935 A1 | 6/2005 | O'Leary et al. | |
| 2005/0133588 A1 | 6/2005 | Williams | |
| 2005/0149455 A1 | 7/2005 | Bruesewitz et al. | |
| 2005/0154628 A1 | 7/2005 | Eckart et al. | |
| 2005/0154769 A1 | 7/2005 | Eckart et al. | |
| 2005/0262493 A1 | 11/2005 | Schmidt et al. | |
| 2005/0262512 A1 | 11/2005 | Schmidt et al. | |
| 2006/0010130 A1 | 1/2006 | Leff et al. | |
| 2006/0026120 A1 | 2/2006 | Carolan et al. | |
| 2006/0026561 A1 | 2/2006 | Bauman et al. | |
| 2006/0031779 A1 | 2/2006 | Theurer et al. | |
| 2006/0053170 A1 | 3/2006 | Hill et al. | |
| 2006/0059423 A1 | 3/2006 | Lehmann et al. | |

(56) References Cited

U.S. PATENT DOCUMENTS

| | | |
|---|---|---|
| 2006/0080139 A1 | 4/2006 | Mainzer |
| 2006/0080283 A1 | 4/2006 | Shipman |
| 2006/0080316 A1 | 4/2006 | Gilmore et al. |
| 2006/0129746 A1 | 6/2006 | Porter |
| 2006/0136513 A1 | 6/2006 | Ngo et al. |
| 2006/0143034 A1 | 6/2006 | Rothermel |
| 2006/0143075 A1* | 6/2006 | Carr et al. .................. 705/14 |
| 2006/0143079 A1 | 6/2006 | Basak et al. |
| 2006/0178915 A1 | 8/2006 | Chao |
| 2006/0178954 A1 | 8/2006 | Thukral et al. |
| 2006/0218206 A1 | 9/2006 | Bourbonnais et al. |
| 2006/0218491 A1 | 9/2006 | Grossman et al. |
| 2006/0253502 A1 | 11/2006 | Raman et al. |
| 2006/0265417 A1 | 11/2006 | Amato et al. |
| 2006/0277460 A1 | 12/2006 | Forstall et al. |
| 2007/0000999 A1* | 1/2007 | Kubo et al. ................ 235/380 |
| 2007/0011304 A1 | 1/2007 | Error |
| 2007/0038646 A1 | 2/2007 | Thota |
| 2007/0043686 A1 | 2/2007 | Teng et al. |
| 2007/0061259 A1 | 3/2007 | Zoldi et al. |
| 2007/0061752 A1 | 3/2007 | Cory |
| 2007/0067285 A1 | 3/2007 | Blume |
| 2007/0106582 A1 | 5/2007 | Baker et al. |
| 2007/0113164 A1 | 5/2007 | Hansen et al. |
| 2007/0136095 A1 | 6/2007 | Weinstein |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0178501 A1 | 8/2007 | Rabinowitz et al. |
| 2007/0185867 A1 | 8/2007 | Maga |
| 2007/0192122 A1 | 8/2007 | Routson et al. |
| 2007/0233756 A1 | 10/2007 | D'Souza et al. |
| 2007/0239606 A1 | 10/2007 | Eisen |
| 2007/0245339 A1 | 10/2007 | Bauman et al. |
| 2007/0271317 A1 | 11/2007 | Carmel |
| 2007/0284433 A1* | 12/2007 | Domenica et al. ........... 235/379 |
| 2007/0295797 A1 | 12/2007 | Herman et al. |
| 2007/0299697 A1 | 12/2007 | Friedlander et al. |
| 2008/0005063 A1 | 1/2008 | Seeds |
| 2008/0016155 A1 | 1/2008 | Khalatian |
| 2008/0046481 A1 | 2/2008 | Gould et al. |
| 2008/0069081 A1 | 3/2008 | Chand et al. |
| 2008/0091693 A1 | 4/2008 | Murthy |
| 2008/0103798 A1 | 5/2008 | Domenikos et al. |
| 2008/0103996 A1 | 5/2008 | Forman et al. |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0140576 A1 | 6/2008 | Lewis et al. |
| 2008/0195672 A1 | 8/2008 | Hamel et al. |
| 2008/0208735 A1 | 8/2008 | Balet et al. |
| 2008/0222038 A1 | 9/2008 | Eden et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0249820 A1 | 10/2008 | Pathria et al. |
| 2008/0255973 A1 | 10/2008 | El Wade et al. |
| 2008/0267386 A1 | 10/2008 | Cooper |
| 2008/0270316 A1 | 10/2008 | Guidotti et al. |
| 2008/0281580 A1 | 11/2008 | Zabokritski |
| 2008/0301042 A1* | 12/2008 | Patzer .................... G06Q 20/10 |
| | | 705/39 |
| 2008/0313132 A1 | 12/2008 | Hao et al. |
| 2009/0018996 A1 | 1/2009 | Hunt et al. |
| 2009/0043801 A1 | 2/2009 | LeClair et al. |
| 2009/0055487 A1 | 2/2009 | Moraes et al. |
| 2009/0076845 A1 | 3/2009 | Bellin et al. |
| 2009/0089651 A1 | 4/2009 | Herberger et al. |
| 2009/0094166 A1 | 4/2009 | Aymeloglu et al. |
| 2009/0094270 A1 | 4/2009 | Alirez et al. |
| 2009/0106178 A1* | 4/2009 | Chu ........................... 706/14 |
| 2009/0106242 A1 | 4/2009 | McGrew |
| 2009/0112745 A1* | 4/2009 | Stefanescu ................ 705/35 |
| 2009/0125359 A1 | 5/2009 | Knapic |
| 2009/0125459 A1 | 5/2009 | Norton et al. |
| 2009/0132347 A1* | 5/2009 | Anderson .............. G06Q 30/02 |
| | | 705/14.52 |
| 2009/0150868 A1 | 6/2009 | Chakra et al. |
| 2009/0157732 A1 | 6/2009 | Hao et al. |
| 2009/0164387 A1 | 6/2009 | Armstrong et al. |
| 2009/0171759 A1* | 7/2009 | McGeehan .......... G06Q 30/02 |
| | | 705/35 |
| 2009/0171955 A1* | 7/2009 | Merz ............... G06F 17/30985 |
| 2009/0187546 A1 | 7/2009 | Whyte et al. |
| 2009/0187548 A1 | 7/2009 | Ji et al. |
| 2009/0199106 A1 | 8/2009 | Jonsson et al. |
| 2009/0216562 A1 | 8/2009 | Faulkner et al. |
| 2009/0228365 A1* | 9/2009 | Tomchek ............... G06Q 10/00 |
| | | 705/21 |
| 2009/0228507 A1 | 9/2009 | Jain et al. |
| 2009/0248757 A1 | 10/2009 | Havewala et al. |
| 2009/0249244 A1 | 10/2009 | Robinson et al. |
| 2009/0271343 A1* | 10/2009 | Vaiciulis et al. ............... 706/21 |
| 2009/0281839 A1 | 11/2009 | Lynn et al. |
| 2009/0282068 A1 | 11/2009 | Shockro et al. |
| 2009/0299830 A1 | 12/2009 | West et al. |
| 2009/0307049 A1* | 12/2009 | Elliott et al. ................... 705/10 |
| 2009/0313311 A1 | 12/2009 | Hoffmann et al. |
| 2009/0313463 A1 | 12/2009 | Pang et al. |
| 2009/0313418 A1 | 12/2009 | Herz |
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1* | 3/2010 | Faith et al. .................... 705/71 |
| 2010/0070531 A1 | 3/2010 | Aymeloglu et al. |
| 2010/0070842 A1 | 3/2010 | Aymeloglu et al. |
| 2010/0076813 A1 | 3/2010 | Ghosh et al. |
| 2010/0082541 A1 | 4/2010 | Kottomtharayil |
| 2010/0082671 A1 | 4/2010 | Li et al. |
| 2010/0094765 A1 | 4/2010 | Nandy |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0131502 A1 | 5/2010 | Fordham |
| 2010/0145909 A1 | 6/2010 | Ngo |
| 2010/0161735 A1 | 6/2010 | Sharma |
| 2010/0169192 A1 | 7/2010 | Zoldi et al. |
| 2010/0191563 A1 | 7/2010 | Schlaifer et al. |
| 2010/0204983 A1 | 8/2010 | Chung et al. |
| 2010/0223260 A1 | 9/2010 | Wu |
| 2010/0235915 A1 | 9/2010 | Memon et al. |
| 2010/0262688 A1 | 10/2010 | Hussain et al. |
| 2010/0280851 A1 | 11/2010 | Merkin |
| 2010/0306032 A1* | 12/2010 | Jolley .................... G06Q 30/02 |
| | | 705/7.29 |
| 2010/0306285 A1 | 12/2010 | Shah et al. |
| 2010/0312837 A1 | 12/2010 | Bodapati et al. |
| 2010/0313239 A1 | 12/2010 | Chakra et al. |
| 2011/0004626 A1* | 1/2011 | Naeymi-Rad .......... G06N 7/005 |
| | | 707/776 |
| 2011/0055074 A1 | 3/2011 | Chen et al. |
| 2011/0061013 A1 | 3/2011 | Bilicki et al. |
| 2011/0066497 A1 | 3/2011 | Gopinath et al. |
| 2011/0078173 A1 | 3/2011 | Seligmann et al. |
| 2011/0093327 A1* | 4/2011 | Fordyce et al. ........... 705/14.39 |
| 2011/0099133 A1 | 4/2011 | Chang et al. |
| 2011/0099628 A1 | 4/2011 | Lanxner et al. |
| 2011/0131122 A1 | 6/2011 | Griffin et al. |
| 2011/0153384 A1 | 6/2011 | Horne et al. |
| 2011/0161409 A1 | 6/2011 | Nair et al. |
| 2011/0167060 A1* | 7/2011 | Merz ............... G06F 17/30985 |
| | | 707/727 |
| 2011/0173093 A1* | 7/2011 | Psota et al. ................ 705/26.35 |
| 2011/0179048 A1 | 7/2011 | Satlow |
| 2011/0208565 A1 | 8/2011 | Ross et al. |
| 2011/0208822 A1 | 8/2011 | Rathod |
| 2011/0213655 A1 | 9/2011 | Henkin |
| 2011/0218955 A1 | 9/2011 | Tang |
| 2011/0225482 A1 | 9/2011 | Chan et al. |

(56) References Cited

U.S. PATENT DOCUMENTS

| | | |
|---|---|---|
| 2011/0225586 A1* | 9/2011 | Bentley .............. G06F 9/466 |
| | | 718/101 |
| 2011/0231305 A1 | 9/2011 | Winters |
| 2011/0252282 A1 | 10/2011 | Meek et al. |
| 2011/0258216 A1 | 10/2011 | Supakkul et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0307382 A1 | 12/2011 | Siegel et al. |
| 2011/0314007 A1 | 12/2011 | Dassa et al. |
| 2011/0314024 A1 | 12/2011 | Chang et al. |
| 2012/0004894 A1 | 1/2012 | Butler et al. |
| 2012/0011238 A1 | 1/2012 | Rathod |
| 2012/0011245 A1 | 1/2012 | Gillette et al. |
| 2012/0013684 A1 | 1/2012 | Lucia |
| 2012/0022945 A1* | 1/2012 | Falkenborg et al. ...... 705/14.53 |
| 2012/0054284 A1 | 3/2012 | Rakshit |
| 2012/0059853 A1 | 3/2012 | Jagota |
| 2012/0065987 A1 | 3/2012 | Farooq et al. |
| 2012/0066166 A1 | 3/2012 | Curbera et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084184 A1 | 4/2012 | Raleigh et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0158585 A1 | 6/2012 | Ganti |
| 2012/0159362 A1 | 6/2012 | Brown et al. |
| 2012/0173381 A1 | 7/2012 | Smith |
| 2012/0188252 A1 | 7/2012 | Law |
| 2012/0191446 A1 | 7/2012 | Binsztok et al. |
| 2012/0197657 A1 | 8/2012 | Prodanovic |
| 2012/0197660 A1 | 8/2012 | Prodanovich |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0271827 A1* | 10/2012 | Merz ................ G06F 17/3069 |
| | | 707/737 |
| 2012/0278249 A1 | 11/2012 | Duggal et al. |
| 2012/0323888 A1 | 12/2012 | Osann, Jr. |
| 2013/0006947 A1 | 1/2013 | Olumuyiwa et al. |
| 2013/0016106 A1 | 1/2013 | Yip et al. |
| 2013/0054306 A1 | 2/2013 | Bhalla |
| 2013/0055264 A1 | 2/2013 | Burr et al. |
| 2013/0057551 A1 | 3/2013 | Ebert et al. |
| 2013/0096968 A1 | 4/2013 | Van Pelt et al. |
| 2013/0096988 A1 | 4/2013 | Grossman et al. |
| 2013/0097130 A1 | 4/2013 | Bingol et al. |
| 2013/0110746 A1 | 5/2013 | Ahn |
| 2013/0124193 A1 | 5/2013 | Holmberg |
| 2013/0132348 A1 | 5/2013 | Garrod |
| 2013/0151453 A1* | 6/2013 | Bhanot et al. ................ 706/46 |
| 2013/0166348 A1 | 6/2013 | Scotto |
| 2013/0166480 A1 | 6/2013 | Popsecu et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0226879 A1 | 8/2013 | Talukder et al. |
| 2013/0226944 A1 | 8/2013 | Baid et al. |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246316 A1 | 9/2013 | Zhao et al. |
| 2013/0246537 A1 | 9/2013 | Gaddala |
| 2013/0246597 A1 | 9/2013 | Iizawa et al. |
| 2013/0208565 A1 | 10/2013 | Castellanos et al. |
| 2013/0262328 A1 | 10/2013 | Federgreen |
| 2013/0263019 A1 | 10/2013 | Castellanos et al. |
| 2013/0275186 A1* | 10/2013 | Olives ............ G06Q 10/06393 |
| | | 705/7.39 |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0325826 A1* | 12/2013 | Agarwal .......... G06F 17/30008 |
| | | 707/703 |
| 2014/0006404 A1 | 1/2014 | McGrew et al. |
| 2014/0012724 A1 | 1/2014 | O'Leary et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0089339 A1 | 3/2014 | Siddiqui et al. |
| 2014/0095363 A1* | 4/2014 | Caldwell ............... G06Q 20/10 |
| | | 705/35 |
| 2014/0095509 A1 | 4/2014 | Patton |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129936 A1 | 5/2014 | Richards |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0244284 A1 | 8/2014 | Smith |
| 2014/0258246 A1* | 9/2014 | Lo Faro ............... G06Q 30/02 |
| | | 707/692 |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0003734 A1* | 1/2015 | Barrett ............... G06Q 20/401 |
| | | 382/182 |
| 2015/0012509 A1 | 1/2015 | Kirn |
| 2015/0046481 A1 | 2/2015 | Elliot |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0134512 A1 | 5/2015 | Mueller |
| 2015/0135256 A1 | 5/2015 | Hoy et al. |
| 2015/0161611 A1 | 6/2015 | Duke et al. |
| 2015/0188872 A1 | 7/2015 | White |
| 2015/0254220 A1 | 9/2015 | Burr et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |

FOREIGN PATENT DOCUMENTS

| | | |
|---|---|---|
| CN | 103167093 | 6/2013 |
| CN | 102054015 | 5/2014 |
| DE | 102014204827 | 9/2014 |
| DE | 102014204830 | 9/2014 |
| DE | 102014204834 | 9/2014 |
| DE | 102014213036 | 1/2015 |
| EP | 1672527 A2 | 6/2006 |
| EP | 2487610 | 8/2012 |
| EP | 2778913 | 9/2014 |
| EP | 2778914 | 9/2014 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 3035214 | 6/2016 |
| GB | 2366498 A | 3/2002 |
| GB | 2513472 | 10/2014 |
| GB | 2513721 | 11/2014 |

(56) References Cited

FOREIGN PATENT DOCUMENTS

| | | |
|---|---|---|
| GB | 2517582 | 2/2015 |
| NL | 2013134 | 1/2015 |
| WO | WO 01/25906 A1 | 4/2001 |
| WO | WO 2001/088750 | 11/2001 |
| WO | WO 2005/0116851 | 12/2005 |
| WO | 2009/051987 | 4/2009 |
| WO | 2010/030919 | 3/2010 |
| WO | WO 2010/030911 A2 | 3/2010 |
| WO | WO 2010/030913 | 3/2010 |
| WO | WO 2010/030914 A2 | 3/2010 |
| WO | WO 2012/061162 | 5/2012 |
| WO | WO 2012/119008 A2 | 9/2012 |

OTHER PUBLICATIONS

Appacts, "Smart Thinking for Super Apps,", http://www.appacts.com, accessed online on Jul. 18, 2013 (4 pages).
Apsalar, "Data Powered Mobile Advertising," "Free Mobile App Analytics" and various analytics related screen shots, http://apsalar.com, accessed online on Jul. 18, 2013 (8 pages).
Capptain—Pilot Your Apps, <http://www.capptain.com, accessed online on Jul. 18, 2013 (6 pages).
Countly Mobile Analytics, <http://count.ly/>, accessed online on Jul. 18, 2013 (9 pages).
Distimo—App Analytics, <http://www.distimo.com/app-analytics>, accessed online on Jul. 18, 2013 (5 pages).
Flurry Analytics, <http://www.flurry.com/>, accessed online on Jul. 18, 2013 (14 pages).
Google Analytics Official Website—Web Analytics & Reporting, <http://www.google.com/analytics.index.html>, accessed online on Jul. 18, 2013 (22 pages).
Kontagent Mobile Analytics, <http://www.kontagent.com/>, accessed online on Jul. 18, 2013 (9 pages).
Localytics—Mobile App Marketing & Analytics, <http://www.localytics.com/>, accessed online on Jul. 18, 2013 (12 pages).
Mixpanel—Mobile Analytics, <https://mixpanel.com/>, accessed online on Jul. 18, 2013 (13 pages).
Open Web Analytics (OWA), <http://www.openwebanalytics.com/>, accessed online on Jul. 19, 2013 (5 pages).
Piwik—Free Web Analytics Software, <http://piwik.org/>, accessed online on Jul. 19, 2013 (18 pages).
StatCounter—Free Invisible Web Tracker, Hit Counter and Web Stats, <http://statcounter.com/>, accessed online on Jul. 19, 2013 (17 pages).
TestFlight—Beta Testing on the Fly, <http://testflightapp.com/>, accessed online on Jul. 18, 2013 (3 pages).
trak.io, <http://trak.io/>, accessed online on Jul. 18, 2013 (3 pages).
UserMetrix, <http://usermetrix.com/android-analytics/>, accessed online on Jul. 18, 2013 (3 pages).
Anonymous, "BackTult—JD Edwards One World Version Control System," printed Jul. 23, 2007 (1 page).
Lim et al., "Resolving Attribute Incompatibility in Database Integration: An Evidential Reasoning Approach," Department of Computer Science, University of Minnesota, <http://reference.kfupm.edu.sa/content/r/e/resolving_attribute_incompatibility_in_d_531691.pdf>, pp. 154-163.
Litwin et al., "Multidatabase Interoperability," IEEE Computer, Dec. 1986, vol. 19, No. 12, pp. 10-18. <http://www.lamsade.dauphine.fr/~litwin/mdb-interoperability.pdf>.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Brandel, Mary, "Data Loss Prevention Dos and Don'ts," <http://web.archive.org/web/20080724024847/http://www.csoonline.com/article/221272/Dos_and_Don_is_for_Data_Loss_Prevention>, Oct. 10, 2007, pp. 5.
Conner, Nancy, "Google Apps: The Missing Manual," May 1, 2008, pp. 15.
"E-MailRelay," <http://web.archive.org/web/20080821175021/http://emailrelay.sourceforge.net/> Aug. 21, 2008, pp. 2.
Gorr et al., "Crime Hot Spot Forecasting: Modeling and Comparative Evaluation," Grant 98-IJ-CX-K005, May 6, 2002, 37 pages.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Kontagent Mobile Analytics, <http://www.kontagent.com/> Printed Jul. 18, 2013 in 9 pages.
Microsoft Windows, "Microsoft Windows Version 2002 Print Out 2," 2002, pp. 1-6.
Nadeau et al., "A Survey of Named Entity Recognition and Classification," Jan. 15, 2004, pp. 20.
Sekine et al., "Definition, Dictionaries and Tagger for Extended Named Entity Hierarchy," May 2004, pp. 1977-1980.
SnagIt, "SnagIt 8.1.0 Print Out," Software release date Jun. 15, 2006, pp. 6.
SnagIt, "SnagIt 8.1.0 Print Out 2," Software release date Jun. 15, 2006, pp. 1-3.
Valentini et al., "Ensembles of Learning Machines," M. Marinaro and R. Tagliaferri (Eds.): WIRN VIETRI 2002, LNCS 2486, pp. 3-20.
Notice of Allowance for U.S. Appl. No. 14/265,637 dated Feb. 13, 2015.
Official Communication for European Patent Application No. 14187996.5 dated Feb. 12, 2015.
Official Communication for New Zealand Patent Application No. 628161 dated Aug. 25, 2014.
Official Communication for New Zealand Patent Application No. 622513 dated Apr. 3, 2014.
Official Communication for Great Britain Patent Application No. 1411984.6 dated Dec. 22, 2014.
Official Communication for U.S. Appl. No. 14/304,741 dated Aug. 6, 2014.
Official Communication for U.S. Appl. No. 13/827,491 dated Dec. 1, 2014.
Official Communication for U.S. Appl. No. 14/225,160 dated Jul. 29, 2014.
Official Communication for U.S. Appl. No. 14/225,084 dated Sep. 2, 2014.
Official Communication for U.S. Appl. No. 14/225,006 dated Sep. 10, 2014.
Official Communication for U.S. Appl. No. 14/451,221 dated Oct. 21, 2014.
Official Communication for U.S. Appl. No. 14/463,615 dated Nov. 13, 2014.
Official Communication for U.S. Appl. No. 14/225,160 dated Oct. 22, 2014.
Official Communication for U.S. Appl. No. 14/479,863 dated Dec. 26, 2014.
Official Communication for U.S. Appl. No. 14/319,161 dated Jan. 23, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/225,160 dated Feb. 11, 2015.
"A Tour of Pinboard," <http://pinboard.in/tour> printed on May 15, 2014 (6 pages).
Delicious, <http://delicious.com/> printed on May 15, 2014 (1 page).

(56) References Cited

OTHER PUBLICATIONS

Gu et al., "Record Linkage: Current Practice and Future Directions," Jan. 15, 2004 (32 pages).
Nadeau et al., "A Survey of Named Entity Recognition and Classification," Jan. 15, 2004 (20 pages).
Nin et al., "On the Use of Semantic Blocking Techniques for Data Cleansing and Integration," 11th International Database Engineering and Applications Symposium, 2007 (9 pages).
Extended European Search Report dated Jun. 6, 2012, issued in European Application No. EP08730336.8.
PCT International Search Report dated Dec. 5, 2008, issued in International Application No. PCT/US2008/079072 (1 page).
PCT International Preliminary Report on Patentability and Written Opinion dated Apr. 20, 2010, issued in International Application No. PCT/US2008/079072 (6 pages).
Final Office Action dated Feb. 13, 2012, issued in U.S. Appl. No. 12/556,307 (27 pages).
Office Action dated Oct. 1, 2013, issued in U.S. Appl. No. 12/556,307 (24 pages).
Extended European Search Report dated Apr. 3, 2014, issued in European Application No. EP 09813700.3 (9 pages).
PCT International Search Report dated Apr. 20, 2010, in International Application No. PCT/US2009/056709 (3 pages).
PCT International Preliminary Report on Patentability and Written Opinion dated Mar. 24, 2011, in International Application No. PCT/US2009/056709 (6 pages).
Extended European Search Report dated Aug. 14, 2012, issued in European Application No. EP 08839003.4 (9 pages).
European Examination Report dated Jun. 12, 2013, issued in European Application No. EP 08839003.4 (6 pages).
First Examination Report dated Mar. 20, 2014, issued in New Zealand Application No. 622389 (2 pages).
First Examination Report dated Mar. 20, 2014, issued in New Zealand Application No. 622404 (2 pages).
First Examination Report dated Apr. 2, 2014, issued in New Zealand Application No. 622484 (2 pages).
Keylines.com, "An Introduction to KeyLines and Network Visualization," Mar. 2014, <http://keylines.com/wp-content/uploads/2014/03/KeyLines-White-Paper.pdf> downloaded on May 12, 2014 (8 pages).
Keylines.com, "KeyLines Datasheet," Mar. 2014, <http://keylines.com/wp-content/uploads/2014/03/KeyLines-datasheet.pdf> downloaded on May 12, 2014 (2 pages).
Keylines.com, "Visualizing Threats: Improved Cyber Security Through Network Visualization," Apr. 2014, <http://keylines.com/wp-content/uploads/2014/04/Visualizing-Threats1.pdf> downloaded on May 12, 2014 (10 pages).
Manno et al., "Introducing Collaboration in Single-user Applications through the Centralized Control Architecture," 2010 (10 pages).
Vose et al., "Help File for ModelRisk Version 5," 2007, Vose Software, pp. 349-353. Parts 1 and 2 (total 375 pages).
Bluttman et al., "Excel Formulas and Functions for Dummies," 2005, Wiley Publishing, Inc., pp. 280, 284-286.
Galliford, Miles, "SnagIt Versus Free Screen Capture Software: Critical Tools for Website Owners," <http://www.subhub.com/articles/free-screen-capture-software>, Mar. 27, 2008 (11 pages).
"GrabUp—What a Timesaver!" <http://atlchris.com/191/grabup/>, Aug. 11, 2008 (3 pages).
JetScreenshot.com, "Share Screenshots via Internet in Seconds," <http://web.archive.org/web/20130807164204/http://www.jetscreenshot.com/>, Aug. 7, 2013 (1 page).
Kwout, <http://web.archive.org/web/20080905132448/http://www.kwout.com/> Sep. 5, 2008 (2 pages).
Microsoft, "Registering an Application to a URI Scheme," <http://msdn.microsoft.com/en-us/library/aa767914.aspx>, printed Apr. 4, 2009 (4 pages).
Microsoft, "Using the Clipboard," <http://msdn.microsoft.com/en-us/library/ms649016.aspx>, printed Jun. 8, 2009 (20 pages).
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008 (2 pages).
Online Tech Tips, "Clip2Net—Share files, folders and screenshots easily," <http://www.online-tech-tips.com/free-software-downloads/share-files-folders-screenshots/>, Apr. 2, 2008 (5 pages).
O'Reilly.com, <http://oreilly.com/digitalmedia/2006/01/01/mac-os-x-screenshot-secrets.html> published Jan. 1, 2006 (10 pages).
Schroder, Stan, "15 Ways to Create Website Screenshots," <http://mashable.com/2007/08/24/web-screenshots/>, Aug. 24, 2007 (2 pages).
Warren, Christina, "TUAW Faceoff: Screenshot apps on the firing line," <http://www.tuaw.com/2008/05/05/tuaw-faceoff-screenshot-apps-on-the-firing-line/>, May 5, 2008 (11 pages).
Extended European Search Report dated Apr. 8, 2014, issued in European Application No. EP09813693.0 (5 pages).
PCT International Search Report dated Apr. 19, 2010, issued in International Application No. PCT/US2009/056700 (3 pages).
PCT International Preliminary Report on Patentability and Written Opinion dated Mar. 24, 2011, issued in International Application No. PCT/US2009/056700 (5 pages).
Extended European Search Report dated Apr. 9, 2014, issued in European Application No. EP09813696.3 (6 pages).
PCT International Search Report dated Apr. 1, 2010, issued in International Application No. PCT/US2009/056704 (3 pages).
PCT International Preliminary Report on Patentability and Written Opinion dated Mar. 24, 2011, issued in International Application No. PCT/US2009/056704 (6 pages).
UK Search Report dated Apr. 14, 2014, issued in Application No. GB 1319502.9 (3 pages).
First Examination Report dated Nov. 13, 2013, issued in New Zealand Application No. 617128 (2 pages).
Extended European Search Report dated Jun. 3, 2014, issued in European Application No. 14158958.0 (11 pages).
Extended European Search Report dated Jun. 10, 2014, issued in European Application No. 14158977.0 (10 pages).
Johnson, Maggie, "Introduction to yacc and bison", Handout 13, Jul. 8, 2005, pp. 1-11, retrieved from the internet: http://staff.science.uva.nl/~andy/compiler/yacc-intro.pdf on May 5, 2014.
First Examination Report dated Mar. 27, 2014, issued in New Zealand Application No. 622473 (3 pages).
Hua et al., "A Multi-attribute Data Structure with Parallel Bloom Filters for Network Services", published in "High Performance Computing—HiPC 2006; 13th International Conference", Bangalore, India, Dec. 18-21, 2006, pp. 277-288.
Further Examination Report dated Jun. 19, 2014, issued in New Zealand Application No. 622473 (2 pages).
First Examination Report dated Apr. 1, 2014, issued in New Zealand Application No. 622476 (2 pages).
Further Examination Report dated Jun. 19, 2014, issued in New Zealand Application No. 622476 (2 pages).
First Examination Report dated Mar. 24, 2014, issued in New Zealand Application No. 622439 (2 pages).
Further Examination Report dated Jun. 6, 2014, issued in New Zealand Application No. 622439 (2 pages).
Hansen et al., "Analyzing Social Media Networks with NodeXL: Insights from a Connected World", Elsevier Science, Sep. 2010, pp. 53-67 and 143-164.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 15, 2015.
Chaudhuri et al., "An Overview of Business Intelligence Technology," Communications of the ACM, Aug. 2011, vol. 54, No. 8.
Cohn et al., "Semi-supervised Clustering with User Feedback," Constrained Clustering: Advances in Algorithms, Theory, and Applications 4.1, 2003, pp. 17-32.
Johnson, Steve, "Access 2013 on demand," Access 2013 on Demand, May 9, 2013, Que Publishing.

(56) References Cited

OTHER PUBLICATIONS

Pythagoras Communications Ltd., "Microsoft CRM Duplicate Detection," Sep. 13, 2011, https://www.youtube.com/watch?v=j-7Qis0D0Kc.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Sigrist et al., "PROSITE, a Protein Domain Database for Functional Characterization and Annotation," Nucleic Acids Research 38.Suppl 1, 2010, pp. D161-D166.

SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.

Wang et al., "Research on a Clustering Data De-Duplication Mechanism Based on Bloom Filter," IEEE 2010, 5 pages.

Wikipedia, "Multimap," Jan. 1, 2013, https://en.wikipedia.org/w/index.php?title=Multimap&oldid=530800748.

Notice of Allowance for U.S. Appl. No. 14/479,863 dated Mar. 31, 2015.

Notice of Allowance for U.S. Appl. No. 14/304,741 dated Apr. 7, 2015.

Notice of Allowance for U.S. Appl. No. 14/225,084 dated May 4, 2015.

Notice of Allowance for U.S. Appl. No. 14/319,161 dated May 4, 2015.

Notice of Allowance for U.S. Appl. No. 14/323,935 dated Oct. 1, 2015.

Notice of Allowance for U.S. Appl. No. 14/552,336 dated Nov. 3, 2015.

Official Communication for U.S. Appl. No. 14/225,084 dated Feb. 20, 2015.

Official Communication for U.S. Appl. No. 14/225,006 dated Feb. 27, 2015.

Official Communication for U.S. Appl. No. 14/571,098 dated Mar. 11, 2015.

Official Communication for U.S. Appl. No. 13/669,274 dated May 6, 2015.

Official Communication for U.S. Appl. No. 14/225,160 dated May 20, 2015.

Official Communication for U.S. Appl. No. 14/463,615 dated May 21, 2015.

Official Communication for U.S. Appl. No. 12/556,307 dated Jun. 9, 2015.

Official Communication for U.S. Appl. No. 14/014,313 dated Jun. 18, 2015.

Official Communication for U.S. Appl. No. 14/483,527 dated Jun. 22, 2015.

Official Communication for U.S. Appl. No. 12/556,321 dated Jul. 7, 2015.

Official Communication for U.S. Appl. No. 14/552,336 dated Jul. 20, 2015.

Official Communication for U.S. Appl. No. 14/676,621 dated Jul. 30, 2015.

Official Communication for U.S. Appl. No. 14/571,098 dated Aug. 5, 2015.

Official Communication for U.S. Appl. No. 14/225,160 dated Aug. 12, 2015.

Official Communication for U.S. Appl. No. 14/571,098 dated Aug. 24, 2015.

Official Communication for U.S. Appl. No. 13/669,274 dated Aug. 26, 2015.

Official Communication for U.S. Appl. No. 14/225,006 dated Sep. 2, 2015.

Official Communication for U.S. Appl. No. 14/562,524 dated Sep. 14, 2015.

Official Communication for U.S. Appl. No. 14/813,749 dated Sep. 28, 2015.

Official Communication for U.S. Appl. No. 14/746,671 dated Sep. 28, 2015.

Official Communication for U.S. Appl. No. 14/141,252 dated Oct. 8, 2015.

Official Communication for U.S. Appl. No. 14/483,527 dated Oct. 28, 2015.

Official Communication for U.S. Appl. No. 14/676,621 dated Oct. 29, 2015.

Official Communication for U.S. Appl. No. 14/571,098 dated Nov. 10, 2015.

Official Communication for U.S. Appl. No. 14/562,524 dated Nov. 10, 2015.

Official Communication for U.S. Appl. No. 14/746,671 dated Nov. 12, 2015.

Official Communication for U.S. Appl. No. 14/842,734 dated Nov. 19, 2015.

Official Communication for U.S. Appl. No. 14/306,138 dated Dec. 3, 2015.

Official Communication for U.S. Appl. No. 14/463,615 dated Dec. 9, 2015.

Official Communication for U.S. Appl. No. 14/800,447 dated Dec. 10, 2015.

Official Communication for U.S. Appl. No. 14/225,006 dated Dec. 21, 2015.

Notice of Acceptance for Australian Patent Application No. 2013251186 dated Nov. 6, 2015.

Official Communication for Australian Patent Application No. 2014201506 dated Feb. 27, 2015.

Official Communication for Australian Patent Application No. 2014201507 dated Feb. 27, 2015.

Official Communication for Australian Patent Application No. 2013251186 dated Mar. 12, 2015.

Official Communication for Australian Patent Application No. 2014203669 dated May 29, 2015.

Official Communication for Canadian Patent Application No. 2831660 dated Jun. 9, 2015.

Official Communication for European Patent Application No. 14158977.0 dated Apr. 16, 2015.

Official Communication for European Patent Application No. 14158958.0 dated Apr. 16, 2015.

Official Communication for European Patent Application No. 14200298.9 dated May 13, 2015.

Official Communication for European Patent Application No. 14191540.5 dated May 27, 2015.

Official Communication for European Patent Application No. 14200246.8 dated May 29, 2015.

Official Communication for European Patent Application No. 12181585.6 dated Sep. 4, 2015.

Official Communication for European Patent Application No. 15181419.1 dated Sep. 29, 2015.

Official Communication for European Patent Application No. 15184764.7 dated Dec. 14, 2015.

Official Communication for Great Britain Patent Application No. 1404499.4 dated Sep. 29, 2014.

Official Communication for Great Britain Patent Application No. 1404489.5 dated Oct. 6, 2014.

Official Communication for Great Britain Patent Application No. 1404486.1 dated May 21, 2015.

Official Communication for Great Britain Patent Application No. 1404499.4 dated Jun. 11, 2015.

Official Communication for Netherlands Patent Application No. 2013134 dated Apr. 20, 2015.

Official Communication for Netherlands Patent Application No. 2011729 dated Aug. 13, 2015.

Official Communication for Netherlands Patents Application No. 2012421 dated Sep. 18, 2015.

Official Communication for Netherlands Patents Application No. 2012417 dated Sep. 18, 2015.

Official Communication for Netherlands Patent Application 2012438 dated Sep. 21, 2015.

Official Communication for New Zealand Patent Application No. 622473 dated Mar. 27, 2014.

Ferreira et al., "A Scheme for Analyzing Electronic Payment Systems," Basil 1997.

(56) References Cited

OTHER PUBLICATIONS

Gill et al., "Computerised Linking of Medical Records: Methodological Guidelines,".
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.
Notice of Allowance for U.S. Appl. No. 12/556,307 dated Jan. 4, 2016.
Notice of Allowance for U.S. Appl. No. 14/746,671 dated Jan. 21, 2016.
Notice of Allowance for U.S. Appl. No. 14/094,418 dated Jan. 25, 2016.
Notice of Allowance for U.S. Appl. No. 12/556,307 dated Mar. 21, 2016.
Notice of Allowance for U.S. Appl. No. 14/923,364 dated May 6, 2016.
Official Communication for U.S. Appl. No. 12/556,307 dated Sep. 2, 2011.
Official Communication for U.S. Appl. No. 12/556,307 dated Feb. 13, 2012.
Official Communication for U.S. Appl. No. 12/556,307 dated Mar. 14, 2014.
Official Communication for U.S. Appl. No. 14/304,741 dated Mar. 3, 2015.
Official Communication for U.S. Appl. No. 14/463,615 dated Sep. 10, 2015.
Official Communication for U.S. Appl. No. 14/631,633 dated Sep. 10, 2015.
Official Communication for U.S. Appl. No. 14/225,084 dated Sep. 11, 2015.
Official Communication for U.S. Appl. No. 14/306,147 dated Dec. 24, 2015.
Official Communication for U.S. Appl. No. 14/306,138 dated Dec. 24, 2015.
Official Communication for U.S. Appl. No. 14/225,084 dated Jan. 4, 2016.
Official Communication for U.S. Appl. No. 14/526,066 dated Jan. 21, 2016.
Official Communication for U.S. Appl. No. 14/923,374 dated Feb. 9, 2016.
Official Communication for U.S. Appl. No. 14/571,098 dated Feb. 23, 2016.
Official Communication for U.S. Appl. No. 14/516,386 dated Feb. 24, 2016.
Official Communication for U.S. Appl. No. 14/014,313 dated Feb. 26, 2016.
Official Communication for U.S. Appl. No. 14/800,447 dated Mar. 3, 2016.
Official Communication for U.S. Appl. No. 15/017,324 dated Apr. 22, 2016.
Official Communication for U.S. Appl. No. 14/526,066 dated May 6, 2016.
Official Communication for U.S. Appl. No. 14/975,215 dated May 19, 2016.
Official Communication for U.S. Appl. No. 14/923,374 dated May 23, 2016.
Official Communication for U.S. Appl. No. 14/800,447 dated Jun. 6, 2016.
Official Communciation for Australian Patent Application No. 2014201506 dated Feb. 27, 2015.
Notice of Acceptance for Australian Patent Application No. 2014203669 dated Jan. 21, 2016.
European Search Report for European Patent Application No. 09812700.3 dated Apr. 3, 2014.
Official Communication for European Patent Application No. 14158977.0 dated Mar. 11, 2016.
Official Communication for European Patent Application No. 14158958.0 dated Mar. 11, 2016.
Official Communication for European Patent Application No. 10188239.7 dated Mar. 24, 2016.
Official Communication for European Patent Application No. 15200073.3 dated Mar. 30, 2016.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404489.5 dated May 21, 2015.
Official Communication for Great Britain Patent Application No. 1411984.6 dated Jan. 8, 2016.
Official Communication for Netherlands Patent Application No. 2012421 dated Sep. 18, 2015.
Official Communication for New Zealand Patent Application No. 622380 dated Mar. 20, 2014.

\* cited by examiner

RESOLVING SIMILAR ENTITIES FROM A TRANSACTION DATABASE

BACKGROUND OF THE INVENTION

Field of the Invention

Embodiments of the present invention generally relate to data analysis and, more specifically, to resolving similar entities from a transaction database.

Description of the Related Art

Financial institutions store transactional data for analysis. A financial institution generates transactional data from credit and debit card purchases at companies that have a merchant account with the financial institution. The merchant account may be used to processes individual credit or debit card purchases. In turn, each such purchase is stored as a transaction record in a transaction database. A transaction record associated with a particular merchant account oftentimes includes a merchant ID attribute that links the transaction record to the merchant account. A merchant ID may be any data type, including a number, a string, or some combination thereof. The financial institution may then analyze the transaction records from one or more merchant accounts. For example, an analysis may involve aggregating the transaction records of a merchant account or particular merchant accounts. The analysis may then compare the performance of the merchant account to that of competing merchant accounts in the same geographic area.

Although the financial institution stores the transaction records in a database of transactions, certain analysis may require the data to be organized in ways that are not part of the transaction records in the database. These databases contain sets of transaction records that an analysis should group together, even though there is no single attribute value that relates the transaction records. For example, if a financial institution configures a database of transactions with a merchant ID attribute that links each transaction record to a merchant account, then an analysis would easily aggregate transaction records with the same merchant ID together. However, a single company may have multiple merchant accounts with a financial institution. If the financial institution provides distinct merchant IDs for every merchant account, even when multiple merchant accounts belong to a single company, then it is difficult to aggregate transaction records together from the multiple merchant accounts of that company. For instance, a franchise company may have distinct merchant accounts with distinct merchant IDs for each franchisee location. In such a case, an analysis could not aggregate the transaction records of the franchise company together based on identical merchant IDs alone. Instead, an analysis can use similarities between the merchant ID attribute values to aggregate the transaction records of the franchise company together.

Existing techniques rely upon simple tests, such as string comparisons between an attribute in a database of transaction records to detect similarities between groups of transaction records. Transaction records including attribute strings that meet a measure of similarity are then aggregated together for analysis. These techniques may work as long as the attribute contains strings that are identical or similar for groups of transaction records that should be aggregated together and strings that are distinct for groups of transaction records that should not be aggregated together.

However, such identifiers are not always (or even usually) available. For example, different merchant IDs for the merchant accounts of a single company may prevent an analysis system from aggregating the transaction records of the company together. Furthermore, transaction records may contain similar identifiers that an analysis system may base aggregations upon, even if the transaction records should not be aggregated together. For example, two different companies may have merchant accounts with similar merchant IDs, which an analysis system could mistakenly match to one company. The analysis system may then mistakenly aggregate the transaction records of the two companies together.

As the foregoing illustrates, there remains a need for more effective techniques evaluating financial transaction records.

SUMMARY OF THE INVENTION

One embodiment of the present invention sets forth a method identifying related transaction records from a database storing transaction records for multiple entities includes grouping transaction records with a common attribute value into transaction record sets, receiving a selection of an exemplar record set and determining the probability the transaction record set stores transaction records associated with a first entity. The method also includes resolving the transaction record set as storing transaction records associated with the first entity.

Other embodiments of the present invention include, without limitation, a computer-readable storage medium including instructions that, when executed by a processing unit, cause the processing unit to implement aspects of the approach described herein as well as a system that includes different elements configured to implement aspects of the approach described herein.

One advantage of the disclosed technique is that two record sets in a database of transaction records that have no identical attributes, but belong to the same common entity, may be linked to the common entity. Therefore, resolutions that would be missed with string comparisons alone are made and incorrect resolutions based only on similar strings are avoided, which improves the resolution precision. Another advantage of the disclosed technique is that it reduces the number of mistaken aggregates resulting from transaction records having similar identifiers despite being associated with different entities.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention may be used to aggregate certain financial transaction records that are resolved to a common entity, but might not otherwise be grouped with one another. Assuming a transaction database of a financial institution identifies transaction records from each distinct merchant account of a company by a distinct merchant ID attribute, then the distinct merchant IDs attributes may not be matched correctly to link the transaction records of the accounts with the company. As another example, different franchisees of common franchisor will have spate merchant accounts, making it difficult to aggregate the transaction records associated with all franchisees of the franchisor from the transaction records alone. In one embodiment, a financial analysis system combines transaction records into merchant ID sets based upon identical merchant IDs, so each merchant ID set contains all of the transaction records with a particular merchant ID. As this example illustrates, a single company may be represented by multiple merchant IDs. To evaluate the full set of transaction records for a single entity (company) each collection of financial transaction records (the merchant ID sets) associated with the single entity need to be merged together.

In one embodiment, the analysis system aggregates transaction records from a large collection of merchant ID sets. This aggregation may include calculating the average transaction size, the transaction size standard deviation, or the average amount that an individual has spent. The analysis system uses the aggregates to train a classifier. Once trained, the analysis system produces a confidence score of whether two merchant ID sets belong to a company, based upon the aggregates from the pair of merchant ID sets. To associate the merchant ID sets to the company, the analysis system receives a selection of an exemplar merchant ID set that should be associated with the company and best represents the characteristics of the company. The analysis system compares the exemplar merchant ID set with other merchant ID sets to determine a confidence score. The confidence score represents the likelihood that the exemplary merchant ID set and the other merchant ID set is associated with the company. The analysis system associates every merchant ID set having a confidence scores above a threshold, when compared with the exemplar, to the company. Doing so results in a collection of financial transaction records that presumably all belong to one company, despite the fact that many of such records may include different merchant IDs.

In the following description, numerous specific details are set forth to provide a more thorough understanding of the present invention. However, it will be apparent to one of skill in the art that the present invention may be practiced without one or more of these specific details.

Figure 1:
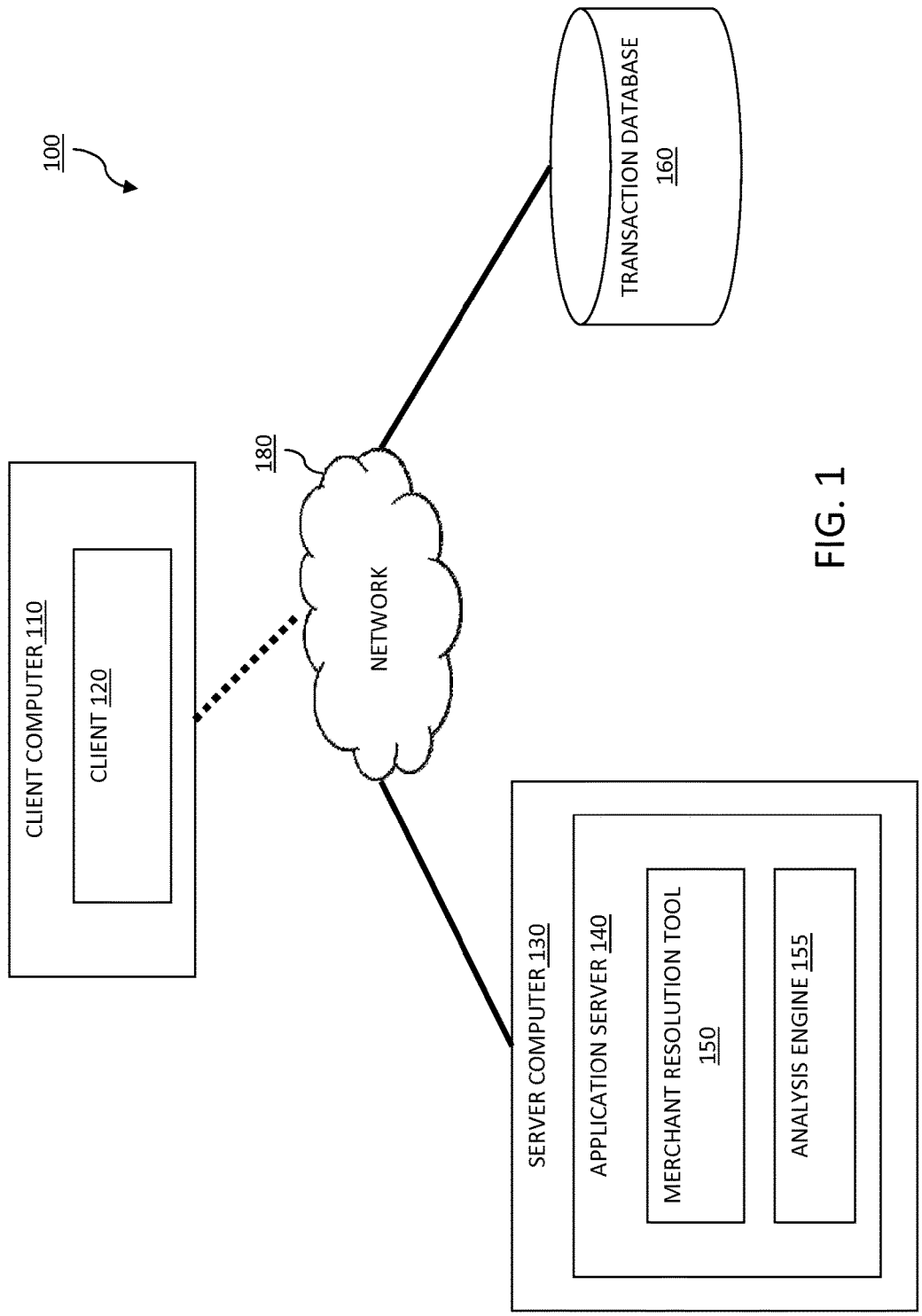
FIG. 1 is a block diagram illustrating a computer system configured to implement one or more aspects of the present invention.

FIG. 1 is a block diagram illustrating an example data analysis system 100, according to one embodiment of the present invention. As shown, the data analysis system 100 includes an application server 140 running on a server computing system 130, a client 120 running on a client computer system 110, and at least one transaction database 160. Further, the client 120, application server 140, and transaction database 160 may communicate over a network 180.

The client 120 represents one or more software applications configured to present data and translate user inputs into requests for data analyses by the application server 140. In this embodiment, the client 120 connects to the application server 140. However, several clients 120 may execute on the client computer 110 or several clients 120 on several client computers 110 may interact with the application server 140. In one embodiment, the client 120 may be a browser accessing a web service.

Alternatively, the client 120 may run on the same server computing system 130 as the application server 140. In any event, a user would interact with the data analysis system 100 through the client 120.

The application server 140 is configured to include a merchant resolution tool 150 and an analysis engine 155. The merchant resolution tool 150 links matching merchant IDs to a company. The merchant resolution tool 150 reads data from the transaction database 160. The merchant resolution tool 150 may store resolution data on the server computer 130 or on the transaction database 160.

The analysis engine 155 uses the resolution data from the merchant resolution tool 150 to analyze data retrieved from the transaction database 160. The analysis engine 155 aggregates and compares the transaction records from the transaction database 160 to provide insights about a particular company. For instance, a financial institution may design a data analysis to evaluate the seasonal spending trends for a franchise company. However, each franchisee of the franchise company may have a distinct merchant account with the financial institution. The financial institution stores the transaction records from the merchant accounts with distinct merchant IDs that associate a transaction record with a merchant account. To evaluate the full set of transaction records for the franchise company the analysis engine 155 needs to merge each collection of financial transaction records from each franchisee together. Therefore, the analysis engine 155 uses the resolution data from the merchant resolution tool 150 to merge the financial transaction records from each franchisee together into a full set of transaction records for the franchise company in order to evaluate the seasonal spending trends for the franchise company.

In this embodiment, the transaction database 160 stores data records of financial transactions associated with a financial institution. For example, the transaction database may include data records for a large number of merchant accounts processing credit and debit card transaction. In such a case, each record would include data attributes for the amount spent, the transaction date and time, the address of the merchant, and a merchant ID to associate the record with a particular merchant account.

Figure 2:
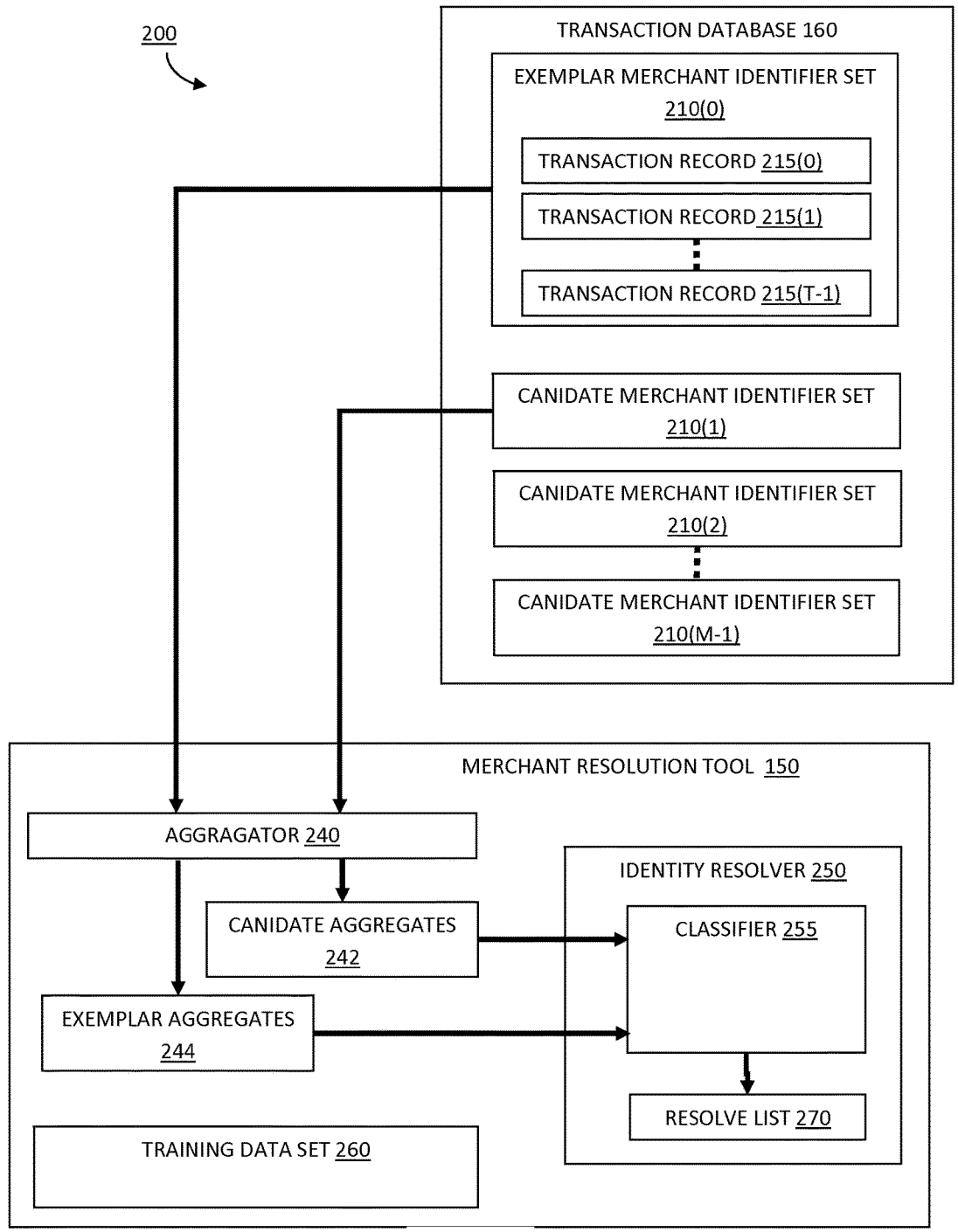
FIG. 2 is a block diagram of the flow of data in through the application server.

The transaction database 160 may be a Relational Database Management System (RDBMS) that stores the transaction data as rows in relational tables. Alternatively, the transaction database 160 may be stored on the same server computing system 130 as the application server 140. The data records of a financial institution FIG. 2 illustrates a flow of data from the transaction database 160 through the merchant resolution tool 150, according to one embodiment of the present invention. As shown, the transaction database 160 includes merchant ID sets 210. Each merchant ID set 210 includes transaction records 215 with the same merchant ID, such as credit and debit card transactions processed for a single merchant account at a financial institution. The merchant resolution tool 150 includes an aggregator 240, candidate aggregates 242, exemplar aggregates 244, training data set 260, and an identity resolver 250. The identify resolver 250 itself includes a classifier 255 and a resolve list 270.

In one embodiment, the classifier 255 is a random forest classifier. A random forest classifier is a machine learning algorithm that is generally known to be highly accurate on large databases that include discrete, continuous, and missing data, as may be the case for financial transaction records 215 in the transaction database 160. Random forest classifiers include multiple decision trees. The decision trees evaluate features of input data. In the present context, of financial transaction records that are associated with merchant accounts by a merchant id, the evaluated features may include:

- Word overlap count and frequency of merchant ID attributes
- Word-based cosine similarity weighted by per-term inverse document frequency scores of merchant ID attributes
- Character-based cosine similarity of merchant ID attributes
- Placement of word overlap of merchant ID attributes
- Identification of the string ".com"
- If the merchant ID attributes includes a store code
- Overlap of prefix or suffix digits in the merchant ID attributes
- Whether the provided city is numeric
- Matching unique merchant category codes
- Fractional difference in average ticket amounts
- Standard deviations from the average ticket amounts
- Fractional difference in magnitude of the ticket amount variances Note, the classifier 255 may evaluate a variety of other features, depending on the needs of a particular case and data available from the underlying transaction records. Further one of ordinary skill in the art will recognize that a random forest classifier is used as a reference example of a classifier and that a variety of other machine learning classifiers could be used.

To evaluate the variety of features the classifier 255 grows decision trees based upon the probability that a selected feature should lead to a certain classification. In the present context, the classifier 255 grows several decision trees based upon different combinations of the features, so that each decision tree classifies a pair of merchant ID sets 210 as matching the same company or not. The output of the classifier 255 is the percentage of decision trees that classify a pair of merchant ID sets 210 as matching the same company.

To prepare for linking merchant IDs to a company, the classifier 255 grows the decision trees by training on the training data set 260. The training data set 260 includes pairs of merchant ID sets 210 that match the same company and pairs of merchant ID sets 210 that do not match the same company. The pairs of merchant ID sets 210 that match the same company are classified as positive examples in the training data set 260. The pairs of merchant ID sets 210 that do not match the same company are classified as negative examples in the training data set 260. As the classifier 255 processes the features of each pair of merchant ID sets 210 as a positive or negative example, the classifier 255 becomes more accurate by refining the probabilities used in the decision trees.

The training data set 260 may also include difficult edge cases, such as pairs of merchant ID sets 210 that do not match, but have similar merchant ID strings. A pair of merchant ID sets 210 with similar merchant ID strings that should not be linked to the same company is an edge case, because oftentimes similar merchant ID strings come from merchant ID sets 210 that should be linked to the same company. Adding such edge cases to the training data set 260 causes the classifier 255 to adjust the probabilities in the decision trees of the classifier 255 to better classify pairs of merchant ID sets 210 with similar merchant ID attributes.

To create a large training data set 260, the merchant resolution tool 150 may generate pairs of randomly selected merchant ID sets 210, which typically provide negative training examples.

The training data set 260 may include transaction records 215 retrieved from the transaction database 160, may include synthetic transaction records 215, or may include some combination thereof. While a training data set 260 of 4,000 pairs of merchant ID sets 210 has proven to be effective, the actual size of the training data set 260 may be set as a matter of preference.

Once the classifier 255 is trained, the merchant resolution tool 150 may be used to associate merchant IDs from distinct merchant account to a company, so that the analysis engine 155 may run data analyses on full sets of transaction records 215 from all merchant accounts of the company.

The transaction database 160 is configured to include a mechanism for providing transaction records 215 with a common merchant ID attribute as merchant ID sets 210. For example, the transaction database 160 may store transaction records 215 with equal merchant ID attributes together in merchant ID sets 210 or the transaction database 160 may store transaction records 215 sequentially by the value of a transaction date attribute. Regardless of the arrangement of the transaction records 215, the merchant resolution tool 150 may retrieve merchant ID sets 210 from the transaction database 160.

After a user selects a merchant ID set 210 as an exemplar merchant ID set 210(0), other merchant ID sets 210 may be considered as candidate merchant ID sets 210(1) through 210(M−1). The user selects the exemplar merchant ID set 210(0) as being representative of the characteristics of the company to be resolved. The exemplar merchant ID set may include a large number of transaction records 215. A large number of transaction records 215 may provide aggregates, such as the average transaction size, that are more accurate than merchant ID sets 210 with fewer transaction records 215. Other factors, such as geographic locations, the merchant ID string, or other business heuristics may also guide the selection of the exemplar merchant ID set 210(0) from the available merchant ID sets 210.

When linking merchant IDs to a company, the merchant resolution tool 150 retrieves the transaction records 215 of the exemplar merchant ID set 210(0) and the transaction records 215 of a candidate merchant ID set 210(1). The aggregator 240 aggregates the attributes of the transaction records 215 of the exemplar merchant ID set 210(0) to produce exemplar aggregates 244. For example, the aggregator 240 calculates the average transaction size, the transaction size standard deviation, or the average amount that an individual has spent. The merchant ID attribute of the exemplar merchant ID set 210(0) is also included with the exemplar aggregates 244. The aggregator 240 also calculates the candidate aggregates 242 from the candidate merchant ID set 210 and includes the merchant ID attribute of the candidate merchant ID set 210(1) with the candidate aggregates 242. Note that the aggregator 240 may calculate additional aggregate values, according to numerous different designs that the tool developer can choose.

After the aggregator 240 determines the aggregate values, the merchant resolution tool 150 passes the exemplar aggregate 244 and the candidate aggregate 242 to an identity resolver 250. The classifier 255 determines the values used as features in the decision trees from the data included in the exemplar aggregates 244 and the candidate aggregates 242. The classifier 255 processes the exemplar aggregate 244 and the candidate aggregate 242 to produce a confidence score between zero and one equal to how likely the exemplar merchant ID set 210(0) matches the candidate merchant ID set 210(1) and should therefore be linked to the same company. If the exemplar merchant ID set 210(0) and the candidate merchant ID set 201(1) receive a score over some threshold, such as 0.70, then the identity resolver 250 stores the merchant ID of the candidate merchant ID set 201(1) in a resolve list 270.

The merchant resolution tool 150 compares candidate merchant ID sets 210(2) through 210(M−1) with the exemplar merchant ID set 210(0). The identity resolver 250 adds the merchant ID of each candidate merchant ID set 210(1) through 210(M−1) that produces a high confidence score to the resolve list 270. Therefore, the merchant IDs on the resolve list 270 represent the merchant ID sets 210 that belong to the same company as the exemplar merchant ID set 210(0).

The merchant resolution tool 150 stores the resolve list 270 for use by the analysis engine 155. In turn, the analysis engine 155 may analyze the full collection of transaction records 215 of the company independent of the various merchant IDs included in the transaction records 215 of the company. For example, if the various merchant IDs in a resolve list 270 associate transaction records 215 with multiple merchant accounts from multiple franchisees of a franchise company. Then the analysis engine 155 should merge the transaction records 215 with the merchant IDs in the resolve list 270 to analyze the full collection of transaction records 215 of the franchise company.

Figure 3:
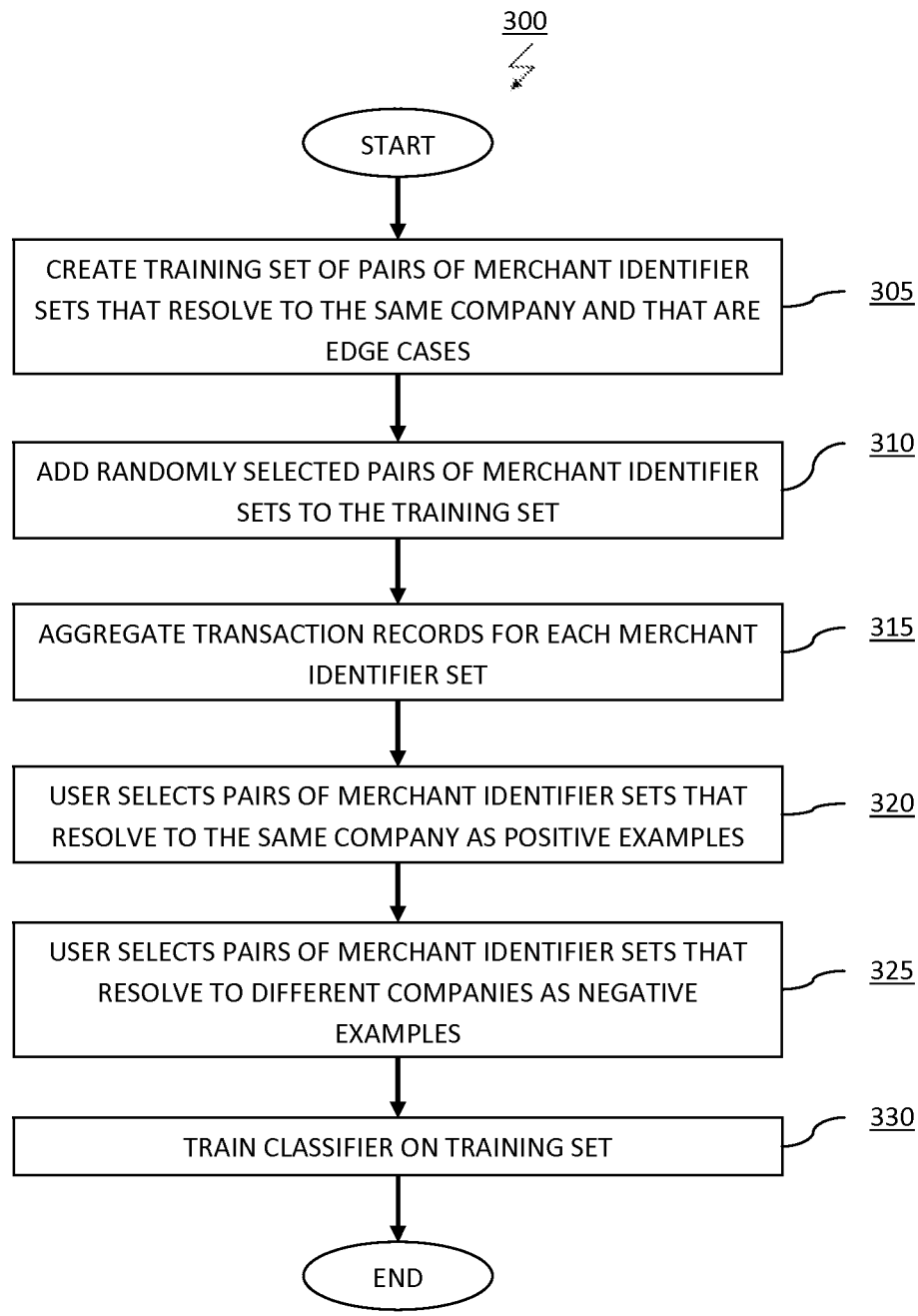
FIG. 3 illustrates a method for training the classifier, according to one embodiment.

FIG. 3 is a flow diagram of method steps for training the classifier 255, according to one embodiment of the present invention. Although the method steps are described in conjunction with the systems of FIGS. 1-2 and 5, persons of ordinary skill in the art will understand that any system configuration to perform the method steps, in any order, is within the scope of the invention.

As shown, method 300 beings at step 305, where a merchant resolution tool 150 creates a training data set 260 of positive examples of pairs of merchant ID sets 210 that link to the same company. The merchant resolution tool 150 adds edge cases to the training data set 210. The edge cases include pairs of merchant ID sets 210 that do not match, but have similar merchant ID strings. The edge cases may also include pairs of merchant ID sets 210 that have similar aggregate values, but are from different companies, so are actually negative training examples.

In step 310, the merchant resolution tool 150 adds randomly selected pairs of merchant ID sets 210 to the training data set 260. The randomly selected pairs of merchant ID sets 210 should include a majority of negative training examples.

In step 315, the merchant resolution tool 150 submits each merchant ID sets 210 in the training data set 260 to the aggregator 240 to generate candidate aggregates 242. When training the classifier 255, there is no exemplar merchant ID set 210(0), so all merchant ID sets 210 in the training data set 260 are considered candidates merchant ID sets 210(1) through 210(M−1). A user may review these candidate aggregates 242.

In step 320, the user selects pairs of merchant ID sets 210 that should be linked to the same company as positive training examples.

In step 325, the user selects pairs of merchant ID sets 210 that link to different companies as negative training examples. These negative training examples include several difficult edge cases. Additionally, the training data set 210 includes a majority of random selections, so the majority of the pairs of merchant ID sets 210 in the training data set 260 are negative training examples.

In step 330, the merchant resolution tool 150 trains the classifier 255 with the training data set 260. As described, the classifier 255 is a random forest learning algorithm.

After training the classifier 255 with the training data set 260, the classifier 255 may evaluate a pair of merchant ID sets 210 to produce a confidence score, e.g., a value between zero and one. The confidence score equals the percent of decision trees in the random forest algorithm used by the classifier 255 that determine that both merchant ID sets 210 in the pair should be linked to the same company. Therefore, the classifier 255 is able to produce a confidence score that represents whether a pair of merchant ID sets 210 including an exemplar merchant ID set 210(0) and a candidate merchant ID set 210(1) should be linked to the same company.

Figure 4:
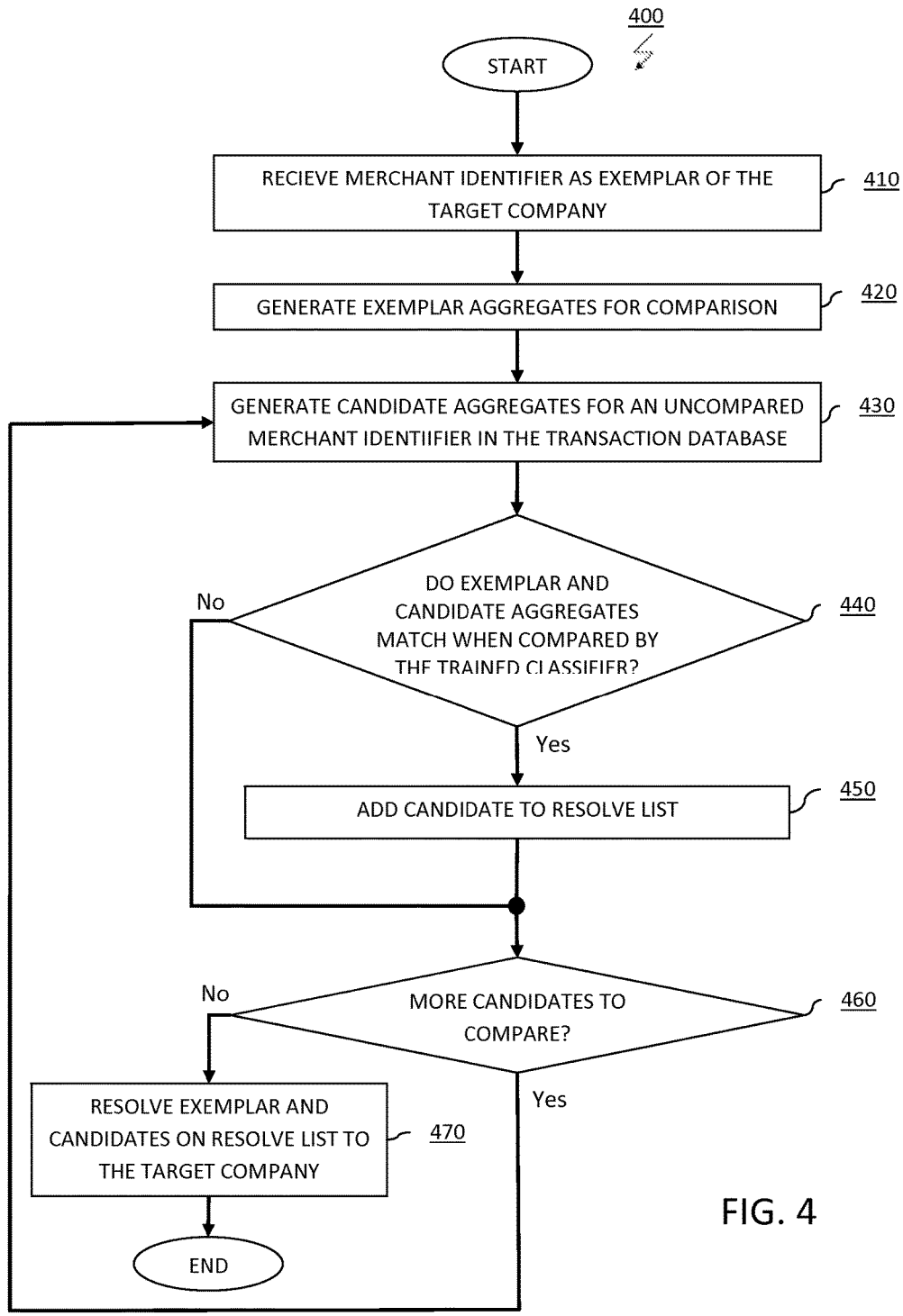
FIG. 4 illustrates a method of resolving merchant ID to a merchant, according to one embodiment.

FIG. 4 is a flow diagram of method steps for linking merchant IDs to a company according to one embodiment of the present invention. Although the method steps are described in conjunction with the systems of FIGS. 1-2 and 5, persons of ordinary skill in the art will understand that any system configuration to perform the method steps, in any order, is within the scope of the invention.

As shown, method 400 beings at step 410, where the merchant resolution tool 150 receives an exemplar merchant ID as the merchant ID attribute for an exemplar merchant ID set 210(0). As described, a user selects the exemplar merchant ID set 210(0) as being representative of the characteristics of the financial transaction records 215 associated with a company, e.g., the franchisee that best represents a given franchise company. Alternatively, the system may automatically choose an exemplar merchant ID set 210(0) based on user-specified criteria.

In one embodiment, the merchant resolution tool 150 presents an exemplar selection tool to the user. The exemplar selection tool provides assistance in selecting an exemplar merchant ID that is representative of a company to be resolved. The exemplar selection tool may accept a search string from the user to identify merchant IDs that should potentially be linked to the company. The exemplar selection tool may also use some subset of the company name as the search string. Furthermore, the exemplar selection tool may submit the merchant ID sets 210 associated with the identified merchant IDs to the aggregator 240. The aggregator 240 then computes aggregates 242 that assist the user in selecting the exemplar merchant ID.

In step 420, the merchant resolution tool 150 generates exemplar aggregates 244 for the selected exemplar merchant ID set 210(0). After the merchant resolution tool 150 retrieves the exemplar merchant ID set 210(0) from the transaction database 160, the aggregator 240 calculates the average transaction size, the transaction size standard deviation, and the average amount that an individual has spent.

In step 430, the merchant resolution tool 150 generates candidate aggregates 242 for a candidate merchant ID set 210(1). The merchant resolution tool 150 identifies a merchant ID set 210(1) through 210(M−1) that has not been compared to the exemplar merchant ID set 210(0), as the candidate merchant ID set 210(1). Once identified, the merchant resolution tool 150 retrieves the candidate merchant ID set 210(1) from the transaction database 160, and submits the candidate merchant ID set 210(1) to the aggregator 240. The aggregator 240 generates the candidate aggregates 242.

The aggregation and comparison of every possible merchant ID record set 210(1) through 210(M−1) may be very time consuming, so reducing the number of comparisons is desirable. In one embodiment, the merchant resolution tool 242 does not compare every merchant ID record set 210. The merchant resolution tool 242 skips merchant ID record sets 210 that do not meet a certain qualification. Assuming a franchise company only has franchisee locations in the state of California and the transaction records 215 include an attribute for the address at which the transaction occurred, then the merchant resolution tool 242 would skip those merchant ID record sets 210 that do not include transaction records 215 from California. In this case, the merchant resolution tool 242 reduces the number of comparisons by skipping those merchant ID sets 210 that are not from California.

In step 440, the merchant resolution tool 150 determines if the exemplar merchant ID set 210(0) and the candidate merchant ID set 210(1) match one another and therefore should be linked to the same company. The identity resolver 250 submits the exemplar aggregates 244 and the candidate aggregates 242 to the classifier 255. As described, the classifier 255 produces a confidence score between zero and one equal to the percent of decision trees in the random forest algorithm used by the classifier 255 that determine that both merchant ID sets 210 in the pair should be linked to the same company. If the classifier 255 produces a confidence score under a threshold, then the method 400 proceeds to step 460. If, however, the confidence score is over the threshold, then method 400 proceeds to step 450. While a threshold confidence score of 0.70 has proven to be effective, the actual threshold may be set as a matter of preference.

In step 450, the identity resolver 250 stores the merchant ID attribute of the candidate merchant ID set 201(1) in a resolve list 270.

In one embodiment, the merchant resolution tool 242 merges the exemplar merchant ID set 240(0) and the candidate merchant ID set 240(1) into a combined merchant ID set, which becomes a new larger exemplar merchant ID set 240(0). Then the merchant resolution tool 242 re-generates the exemplar aggregates 244 for the remaining comparisons. In doing so, the new exemplar merchant ID set 240(0) may better represent the company and improve the resolution of the remaining candidate merchant ID sets 240(2) through 240(M−1).

In step 460, the merchant resolution tool 150 determines if there are more merchant ID sets 210 in the transaction database 160 that have not been compared. If the merchant resolution tool 150 determines there is another candidate merchant ID set 210(2) to compare, then the method 400 returns to step 430. Once no more candidate merchant ID sets 210 remain to compare, the merchant resolution tool 150 links merchant ID sets 210 listed in the resolve list 270 for the company.

In step 470, the merchant resolution tool 150 links the exemplar merchant ID set 210(0) with the candidate merchant ID sets 210(1) through 210(M−1) listed in the resolve list 270. As described, the resolution of the merchant ID sets may involve storing a list of merchant ID attributes that the analysis engine 155 can use to identify the transaction records 215 of the company. Alternatively, the merchant resolution tool 150 may link the transaction records 215 of the merchant ID sets 210 on the resolve list 270 to the company by populating an attribute of the transaction records 215 with the company name, so that the analysis engine 155 can query the transaction database 160 for the transaction records 215 belonging to the company.

Figure 5:
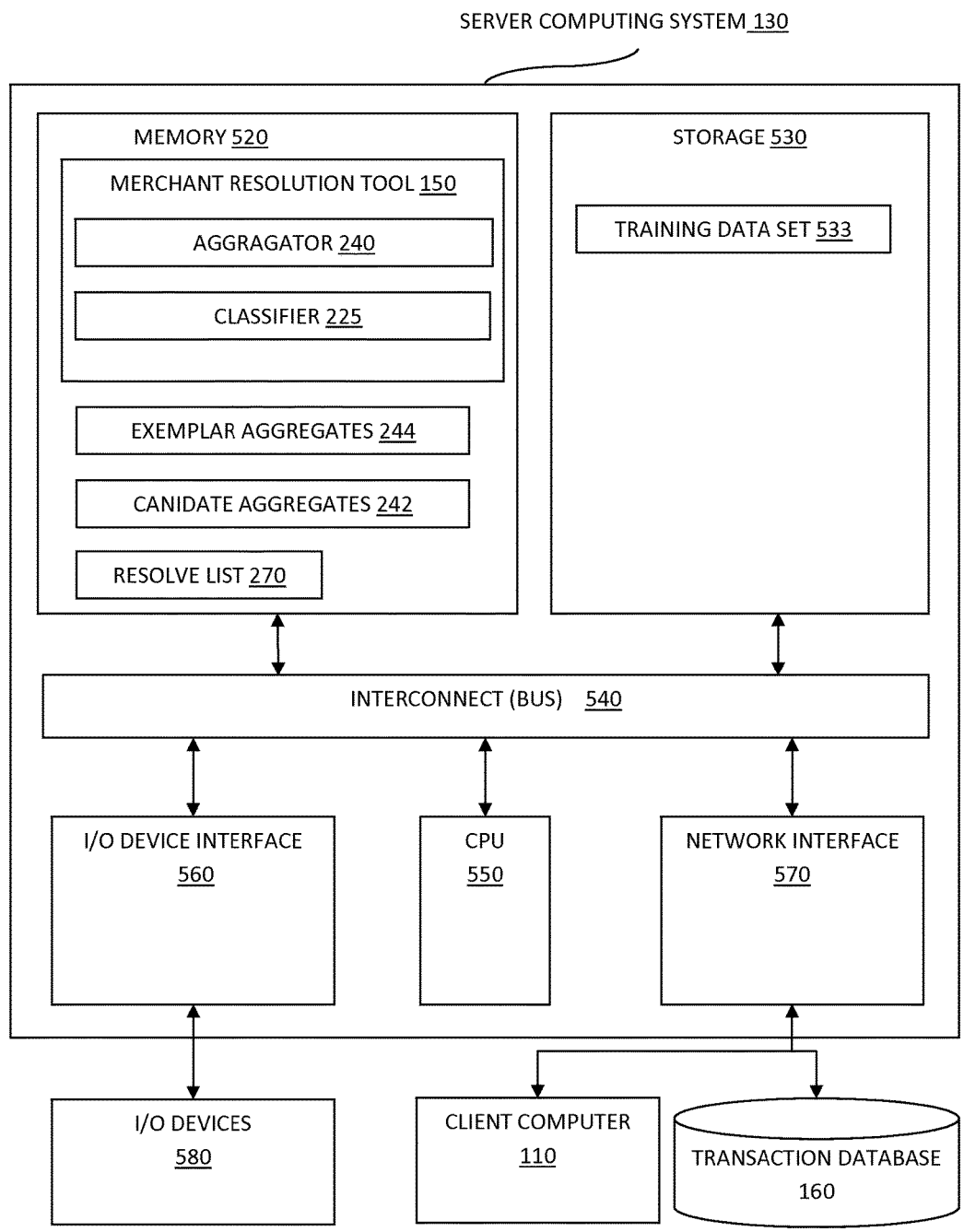
FIG. 5 illustrates an example of a computing environment, according to one embodiment.

FIG. 5 illustrates an example server computing system 130 running a merchant resolution tool 150, according to one embodiment. As shown, the server computing system 130 includes, a central processing unit (CPU) 550, a network interface 570, a memory 520, and a storage 530, each connected to an interconnect (bus) 540. The server computing system 130 may also include an I/O device interface 560 connecting I/O devices 580 (e.g., keyboard, display and mouse devices) to the computing system 130. Further, in context of this disclosure, the computing elements shown in server computing system 130 may correspond to a physical computing system (e.g., a system in a data center) or may be a virtual computing instance executing within a computing cloud.

The CPU 550 retrieves and executes programming instructions stored in memory 520 as well as stores and retrieves application data residing in memory 520. The bus 540 is used to transmit programming instructions and application data between the CPU 550, I/O device interface 560, storage 530, network interface 570, and memory 520. Note that the CPU 550 is included to be representative of a single CPU, multiple CPUs, a single CPU having multiple processing cores, a CPU with an associate memory management unit, and the like. The memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

The communications between the client 120 and the merchant resolution tool 150 are transmitted over the network 180 via the network interface 570.

Illustratively, the memory 520 includes a merchant resolution tool 150, exemplar aggregates 244, candidate aggregates 242, and a resolve list 270. The merchant resolution tool 150 itself includes an aggregator 240 and a classifier 225. The storage 530 includes a training data set 533, which the merchant resolution tool 150 uses to train the classifier 225.

The aggregator 240 generates the exemplar aggregates 244 and the candidate aggregates 242 from transaction records 215 retrieved from the transaction database 160. The merchant resolution tool 150 issues database queries over the network 180 to the transaction database 160 via the network interface 570. Once the aggregator 240 generates the exemplar aggregates 244 and candidate aggregates 242, the merchant resolution tool 150 uses the classifier 225 to determine if the merchant IDs sets 240 should be linked to a company.

Although shown in memory 520, the merchant resolution tool 150, exemplar aggregates 244, candidate aggregates 242, and resolve list 270, may be stored in memory 520, storage 530, or split between memory 520 and storage 530. Likewise, the training data set 533 may be stored in memory 520, storage 530, or split between memory 520 and storage 530.

In some embodiments, the database repository 160 may be located in the storage 530. In such a case, the database queries and subsequent responses are transmitted over the bus 540. As described, the client 120 may also be located on the server computing system 130, in which case the client 120 would also be stored in memory 520 and the user would utilize the I/O devices 580 to interact with the client 120 through the I/O device interface 560.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Examples of computer-readable storage media include (i) non-writable storage media (e.g., read-only memory devices within a computer, CD-ROM disks readable by a CD-ROM drive, flash memory, ROM chips or any type of solid-state non-volatile semiconductor memory); and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for identifying related transaction records from a database storing transaction records for multiple entities performed by one or more processors of a computer system, the method comprising:
   acquiring a plurality of transaction record sets, wherein each transaction record set includes one or more of the transaction records sharing a common attribute value and wherein the transaction records are credit or debit transactions processed by a financial institution for a merchant;
   receiving a selection of or selecting an exemplar record set of the plurality of transaction record sets, wherein the exemplar record set comprises a plurality of the transaction records associated with a first entity of the multiple entities;
   for at least one of the acquired plurality of transaction record sets:
   determining a probability that the transaction record set stores transaction records associated with the first entity based at least in part on a machine learning classifier, the machine learning classifier being trained using one or more first pairs of transaction record sets and one or more second pairs of transaction record sets, wherein a first pair of transaction record sets represents a common entity and a second pair of transaction record sets represents unrelated entities, and
   upon determining the probability exceeds a threshold, resolving the transaction record set as storing transaction records associated with the first entity, the resolving including merging the transaction records of the transaction record set into the exemplar record set that comprises the plurality of the transaction records associated with the first entity.

2. The method of claim 1, wherein attributes of the transaction records include one or more of the following:
   an identification of the merchant from which the transaction originates;
   an identification of the credit or debit account owner;
   an amount of the transaction;
   a date of the transaction;
   a time of the transaction; and
   a location of where the transaction originated.

3. The method of claim 2, further comprising determining, for at least one of the transaction record sets, aggregate values for the attributes of the transaction record set; and
   determining aggregate values for attributes of the exemplar record set.

4. The method of claim 1, wherein determining a probability comprises passing a transaction record set and the exemplar record set to a classifier, wherein the classifier is configured to determine the probability that the transaction record set stores transaction records associated with the first entity.

5. The method of claim 4, wherein the classifier is a random forest classifier.

6. The method of claim 4, wherein the classifier evaluates features of at least one of the acquired transaction records, including at least one of a word overlap count, word frequency, a word-based or character based cosine similarity, merchant category codes, and numeric city codes associated with the at least one of the acquired transaction record.

7. The method of claim 4 wherein the classifier evaluates features of at least one of the acquired transaction records including at least one of a fractional difference in size of an average ticket-size in the transaction record, a standard deviation between the average ticket-sizes in the transaction records, and a fractional difference in a magnitude of ticket-size variances.

8. The method of claim 1, further comprising, performing an analysis on a set of the transaction records, wherein the set includes the transaction records of the exemplar record set and the transaction records resolved as associated with the first entity.

9. A non-transitory computer-readable storage medium storing instructions that, when executed by a processor, cause the processor to perform an operation for identifying related transaction records from a database storing transaction records for multiple entities, the method comprising:
   acquiring a plurality of transaction record sets, wherein each transaction record set includes one or more of the transaction records sharing a common attribute value and wherein the transaction records are credit or debit transactions processed by a financial institution for a merchant;
   receiving a selection of or selecting an exemplar record set of the plurality of transaction record sets, wherein the exemplar record set comprises a plurality of the transaction records associated with a first entity of the multiple entities;
   for at least one of the acquired plurality of transaction record sets:
   determining a probability that the transaction record set stores transaction records associated with the first entity based at least in part on a machine learning classifier, the machine learning classifier being trained using one or more first pairs of transaction record sets and one or more second pairs of transaction record sets, wherein a first pair of transaction record sets represents a common entity and a second pair of transaction record sets represents unrelated entities, and
   upon determining the probability exceeds a threshold, resolving the transaction record set as storing transaction records associated with the first entity, the resolving including merging the transaction records of the transaction record set into the exemplar record set that comprises the plurality of the transaction records associated with the first entity.

10. The computer readable medium of claim 9, wherein attributes of the transaction records include one or more of the following:
an identification of the merchant from which the transaction originates; an identification of the credit or debit account owner; an amount of the transaction; a date of the transaction; a time of the transaction; and
a location of where the transaction originated.

11. The computer readable medium of claim 10, further comprising determining, for at least one of the received transaction record set, aggregate values for the attributes of the transaction record set; and
determining aggregate values for attributes of the exemplar record set.

12. The computer readable medium of claim 9, wherein determining a probability comprises passing a transaction record set and the exemplar record set to a classifier, wherein the classifier is configured to determine the probability that the transaction record set stores transaction records associated with the first entity.

13. The computer readable medium of claim 12, wherein the classifier is a random forest classifier.

14. The computer readable medium of claim 9, further comprising, performing an analysis on a set of the transaction records, wherein the set includes the transaction records of the exemplar record set and the transaction records resolved as associated with the first entity.

15. A computer system, comprising:
a memory; and
a processor storing one or more programs configured to perform an operation for identifying related transaction records from a database storing transaction records for multiple entities, the method comprising:
acquiring a plurality of transaction record sets, wherein each transaction record set includes one or more of the transaction records sharing a common attribute value and wherein the transaction records are credit or debit transactions processed by a financial institution for a merchant;
receiving a selection of or selecting an exemplar record set of the plurality of transaction record sets, wherein the exemplar record set comprises a plurality of the transaction records associated with a first entity of the multiple entities; for at least one of the acquired plurality of transaction record sets:
determining a probability that the transaction record set stores transaction records associated with the first entity based at least in part on a machine learning classifier, the machine learning classifier being trained using one or more first pairs of transaction record sets and one or more second pairs of transaction record sets, wherein a first pair of transaction record sets represents a common entity and a second pair of transaction record sets represents unrelated entities, and
upon determining the probability exceeds a threshold, resolving the transaction record set as storing transaction records associated with the first entity, the resolving including merging the transaction records of the transaction record set into the exemplar record set that comprises the plurality of the transaction records associated with the first entity.

16. The system of claim 15, wherein attributes of the transaction records include one or more of the following:
an identification of the merchant from which the transaction originates;
an identification of the credit or debit account owner;
an amount of the transaction;
a date of the transaction;
a time of the transaction; and
a location of where the transaction originated.

17. The system of claim 16, further comprising determining, for at least one of the received transaction record sets, aggregate values for the attributes of the transaction record set; and
determining aggregate values for attributes of the exemplar record set.

18. The system of claim 15, wherein determining a probability comprises passing a transaction record set and the exemplar record set to a classifier, wherein the classifier is configured to determine the probability that the transaction record set stores transaction records associated with the first entity.

19. The system of claim 18, wherein the classifier is a random forest classifier.

20. The system of claim 9, further comprising, performing an analysis on a set of the transaction records, wherein the set includes the transaction records of the exemplar record set and the transaction records resolved as associated with the first entity.

* * * * *